INVENTORS
Robert W. Ward
BY Edmund A. Watson
George R. Ericson
ATTORNEY

Aug. 7, 1956 R. W. WARD ET AL 2,757,597
SELF-CONTAINER PAINT SPRAY BOOTH
Filed Feb. 2, 1952 4 Sheets-Sheet 3

INVENTORS
Robert W. Ward
Edmund A. Watson
BY George R. Ericson
ATTORNEY

Aug. 7, 1956 R. W. WARD ET AL 2,757,597
SELF-CONTAINER PAINT SPRAY BOOTH
Filed Feb. 2, 1952 4 Sheets-Sheet 4
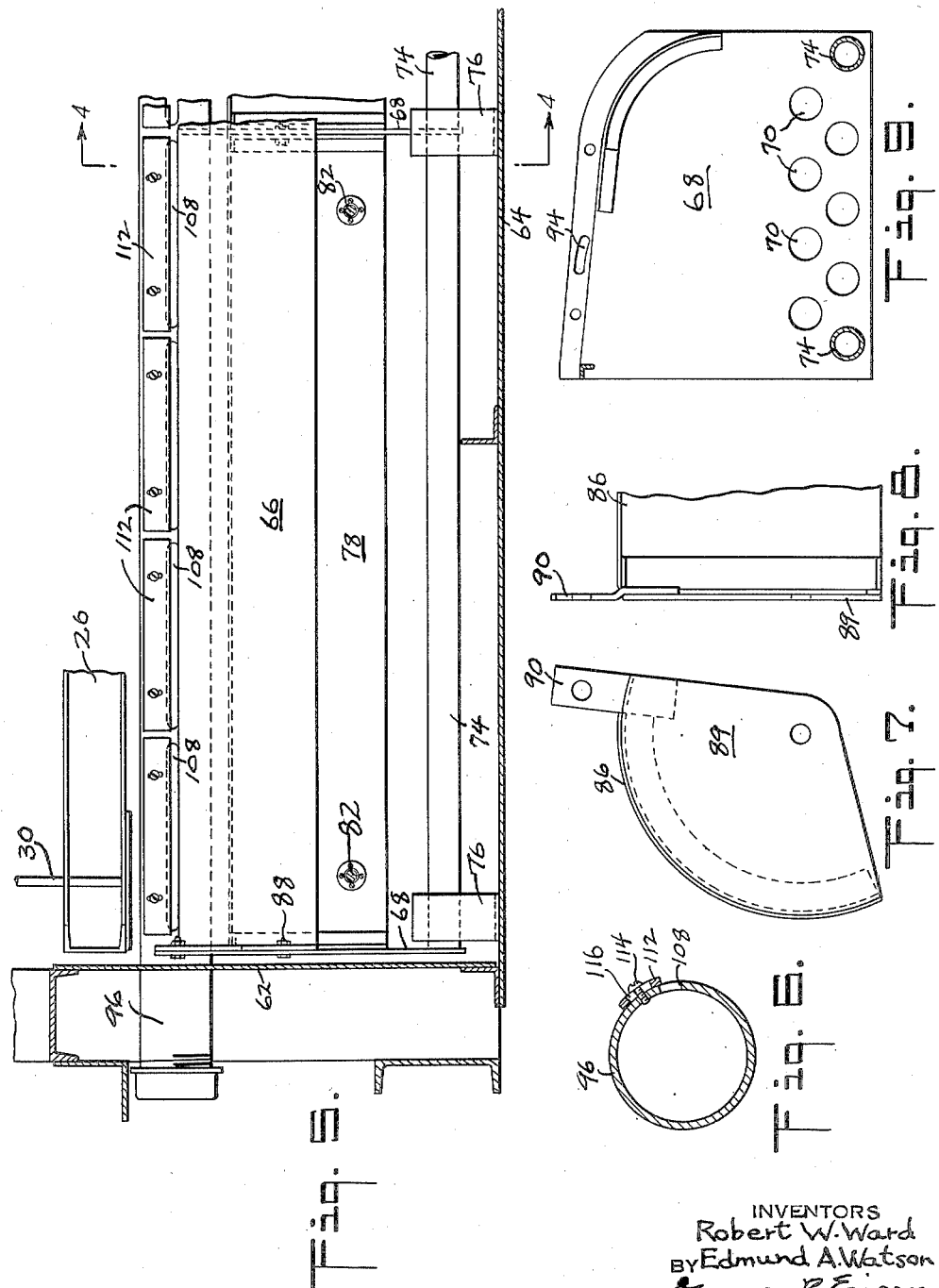
INVENTORS
Robert W. Ward
BY Edmund A. Watson
George R. Ericson
ATTORNEY United States Patent Office 2,757,597
Patented Aug. 7, 1956

2,757,597

SELF-CONTAINED PAINT SPRAY BOOTH

Robert W. Ward, New York, N. Y., and Edmund A. Watson, Ridgewood, N. J., assignors to ACF Industries, Incorporated, a corporation of New Jersey Application February 2, 1952, Serial No. 269,644

10 Claims. (Cl. 98—115)

This invention relates to paint spray booths and particularly to apparatus for removing paint overspray and fumes from the air in a traveling booth.

Traveling booths for painting railway cars and the like have been built from which the paint overspray and fumes are exhausted into a discharge trough cut in the floor of the shop beneath the booth by means of a continuous flexible valve maintained in constant communication therewith. The paint overspray is then removed from the air by passage through a water spray in the trough prior to discharge of the air to the atmosphere. While this is an effective arrangement for handling the paint overspray and fumes, it involves costly permanent installation of facilities in the paint shop or shed where the cars are spray painted.

It is an object of the present invention to provide a self-contained traveling paint spray booth which carries apparatus for removing the paint overspray and fumes from the air while in the booth prior to discharge therefrom directly into the atmosphere of the paint shop or shed.

Another object of the invention is to provide paint overspray removing apparatus for a traveling booth having baffles adjustable in accordance with various conditions of velocity and volume of air and overspray handled by the booth.

Still another object of the invention is to provide a booth of the type described carrying a liquid-containing tank with means for producing a curtain of liquid falling therein, particles of which are caused to form a spray through which the air is drawn to remove paint overspray therefrom prior to discharge from the booth.

A further object of the invention is to provide an arrangement as above described in which the flow of the curtain of liquid can be maintained uniform and its volume controlled.

These and other objects of the invention will be apparent to those skilled in the art from a study of the following description taken with the accompanying drawings, in which:

Fig. 5 is a partial front view of the apparatus taken on line 5—5 of Fig. 4;

Fig. 6 is a cross-sectional view through the liquid supply pipe of the apparatus;

Fig. 7 is an end view of one of the adjustable baffles of the apparatus;

Fig. 8 is a fragmentary side view of the adjustable baffle shown in Fig. 7; and

Fig. 9 is a side view of one of the intermediate supporting plates for the water apron of the overspray removing apparatus.

Figure 1:
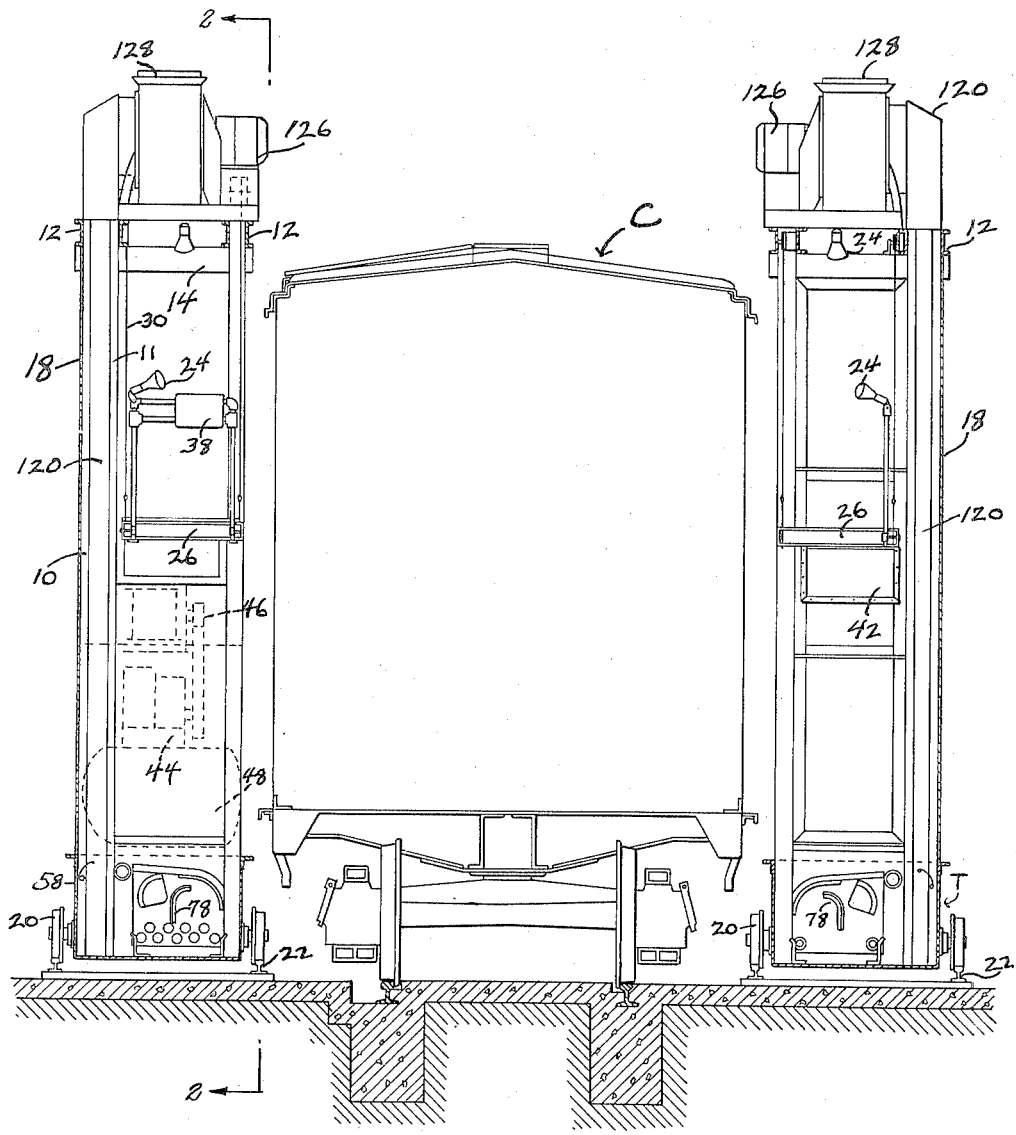
Fig. 1 is an end elevational view showing a pair of booths in position on opposite sides of a railway car to be spray painted.
Figure 2:
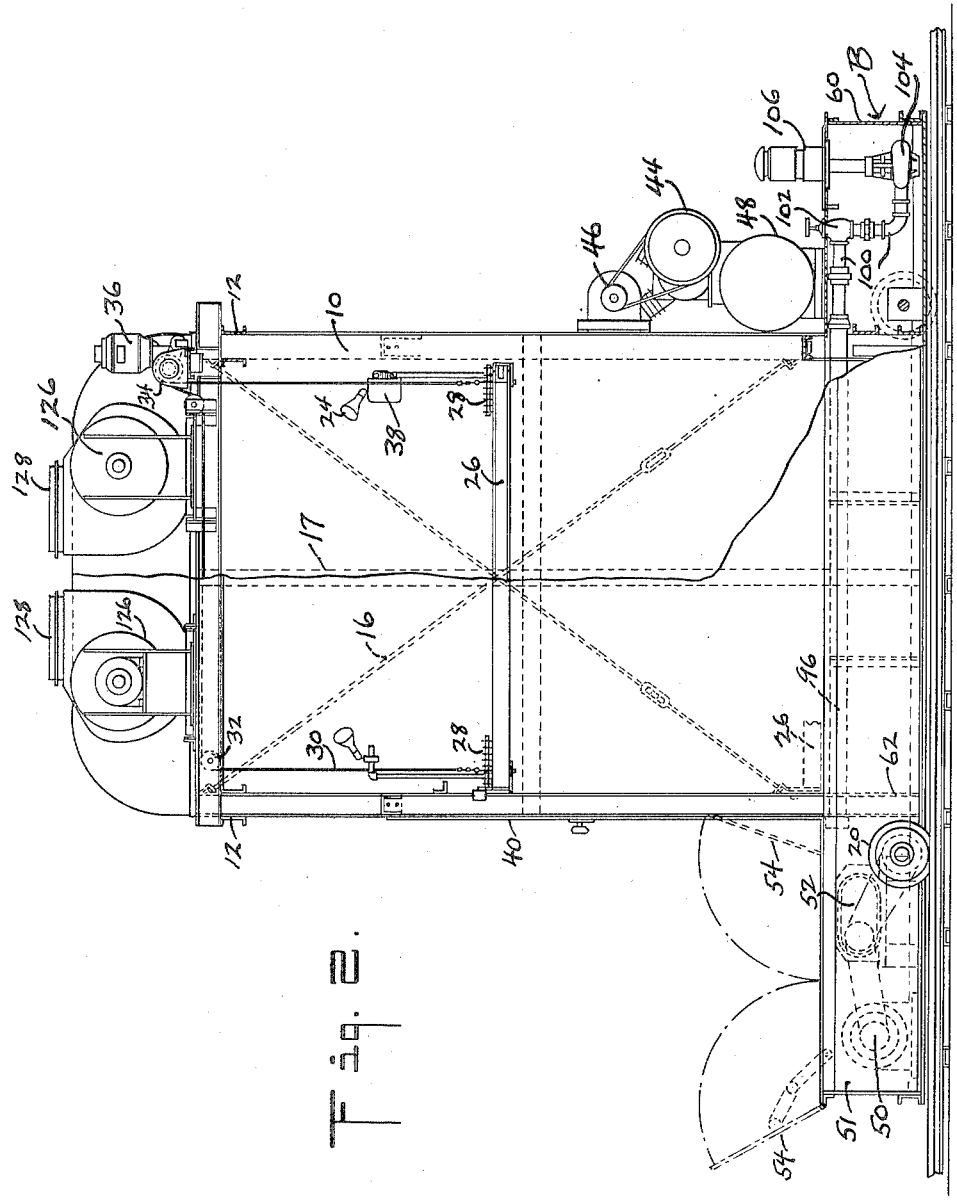
Fig. 2 is a front view of the booth taken on line 2—2 of Fig. 1.

Referring now more in detail to the drawings, the framework of the booth includes upright outer column members 10, column members 11 spaced inwardly therefrom, upper horizontal members 12, top 14 and a base portion B extending beyond opposite ends of the booth. The outer side of the framework is reinforced by adjustable cross rods 16 and further braced by a stiffener 17. The ends and outer side only of the booth framework are covered by sheet metal or similar panels 18, thus forming a substantially closed booth except for the open inner side adjacent to and through which a surface is sprayed. The booth is mounted on wheels 20 running on rails 22 alongside the object or surface to be spray painted, which, as shown in Fig. 1, is a railway car C.

The booth is equipped with electric lights 24 and an elevating platform 26 provided with a grill or grid 28 and suspended by cables 30 over rollers 32 and sheave 34. The elevator platform 26 is operated by motor 36 from a control panel 38, as is also the various other equipment carried by the booth and later referred to. The booth is provided with a door 40 in one end wall and a window 42 in the opposite end wall, and also carries an air compressor 44 driven by motor 46 together with a compressed air storage tank 48. The booth is driven by an electric motor 50 carried in compartment 51 at one end of the base portion B connected through any suitable type of variable speed control mechanism 52 to the wheels 20. The booth may thus be operated at any predetermined and continuous rate of speed along the rails 22. The compartment 51 at the end of the base which houses the motor and speed control mechanism is provided with covers 54 to permit access thereto for servicing and repair. The open inner side of the booth is spaced from the car being sprayed and may be provided with detachable or adjustable profile plates (not shown) conforming to the contour of various types of cars or other objects to be sprayed. Electric current for the lights and operation of the various motors is obtained by any suitable means (not shown).

The overspray removing apparatus includes a liquid containing tank T carried in the bottom of the booth proper and extending from the driving motor compartment 51 into the opposite end of the base portion B. The tank is formed by side walls 58, end walls 60, 62, with reinforcing angles 63, and a bottom 64. A downwardly and inwardly sloping apron 66 having attaching and stiffening flanges 67 is removably mounted in the tank by two or more supporting plates 68, all but the plate adjacent the driving motor compartment 51 being formed with holes or openings 70 to permit passage therethrough of the liquid contained in the tank. The inner side of the apron 66 terminates in a downwardly curved marginal edge portion 72 spaced above the liquid level in the tank to leave a gap therebetween. The apron and supporting plate assembly is tied together by longitudinally extending pipes 74 supported by brackets 76 secured in the tank.

A baffle 78 is adjustably mounted in the tank between the supporting plates 68 beneath the apron and has a curved upper portion 80 directed toward the curved portion 72 of the apron. The baffle 78 is capable of adjustment transversely of the tank, being supported by screw-threaded engagement, as indicated at 81 in Fig. 4, on rods 82 which are removably journalled by any suitable means in the side walls 58 of the tank and provided at one end with a rotary tool engageable portion 84. A second curved adjustable baffle 86 is pivotally supported, as indicated at 88, by quadrant-shaped members 89 on the apron supporting plates 68. The pivotally mounted baffle 86 is provided with an adjusting lever 90 projecting therefrom which carries a pin or bolt 92 extending through a slot 94 in supporting plates 68 and flanges 67 to limit its pivotal movement. It will be seen that with this arrangement the baffle 78 may be adjusted transversely of the tank relative to the apron 66 and the baffle 86, the relative position of the latter also being variable and adjustable due to the pivotal mounting 88. The apron, supporting plate and pipe assembly 66, 68, 74, together with the pivoted baffle 86, may be lifted from the tank as a unit for cleaning or repair after disengaging the rods 82 from baffle 78 to permit withdrawal of the rods.

A liquid delivery or supply pipe 96 runs coextensive with the outer side of the apron 66, being secured to the framework of the booth in any suitable manner, such as by welding to the plate 98, and having a ledge or rib 99 engageable by the apron. The liquid supply pipe 96 is closed at one end and connected at its opposite end by suitable piping 100, including control valve 102, to a pump 104 submerged in the liquid in the tank and operated by motor 106. The liquid delivery pipe 96 is formed with apertures 108 opening onto the outer side of the apron 66 whereby liquid flows over the apron, as indicated by the arrows in Fig. 3, to provide a curtain of liquid falling back into the tank across the gap between the downwardly curved edge portion of the apron and the level 110 of the liquid W in the tank. The apertures 108 are provided with closures 112 adjustably secured to the supply pipe 96 by screws 114 extended through slots 116 in the closure members. By individual adjustment of these closure members 112 over the apertures 108 in accordance with the latter's location relative to the piping 100, a uniform flow of liquid over the apron 66 may be obtained, as well as control of the volume of the flow.

Figure 3:
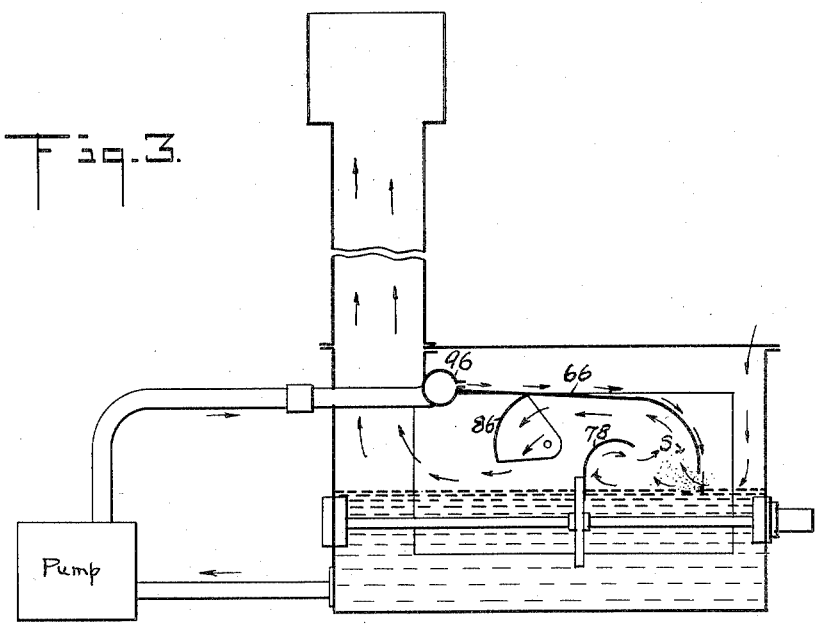
Fig. 3 is a diagrammatic showing of the piping and baffle system of the overspray removing apparatus.
Figure 4:
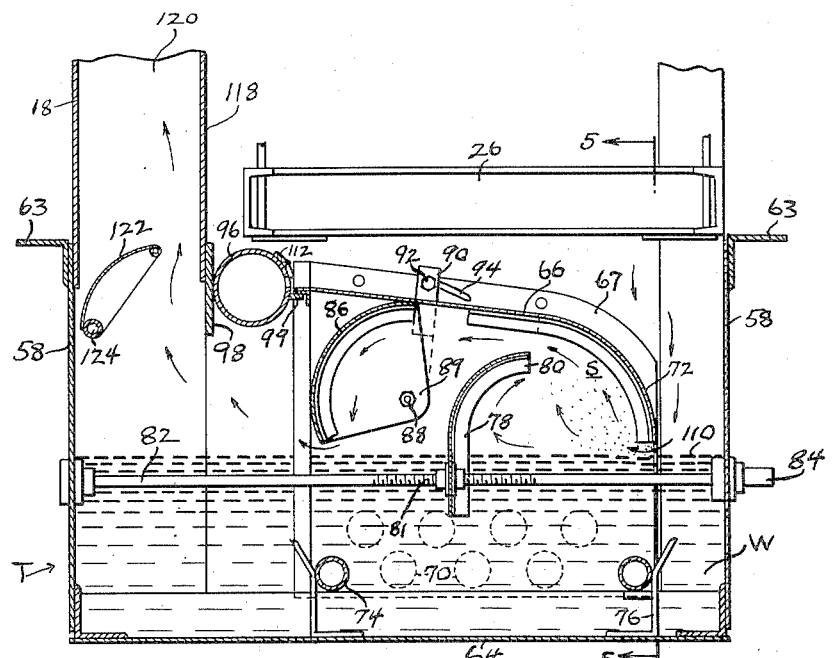
Fig. 4 is a transverse cross-sectional view through the overspray removing apparatus taken on line 4—4 of Fig. 5.

An inner vertical wall 118 extending between the inner upright column frame members 11 is spaced from the outer wall 18 to form an air outlet duct 120 for the booth. An adjustable baffle 122 is pivotally mounted at 124 in the bottom of the outlet duct 120 to further aid in removing the paint overspray from the air passing therethrough, as indicated by the arrows in Fig. 4. Air is drawn into the booth through the space between its open side and the surface being sprayed by the motor-driven fans 126 located on top of the booth near the discharge outlets 128 of the duct 120. As shown in Figs. 3 and 4, the air is drawn through the booth at such velocity over and through the water curtain as to carry particles thereof beyond the curtain to form a spray S. The air thus also passes through this liquid spray, as indicated by arrows in these views to further assist in removing the overspray and fumes therefrom prior to contact with baffles 78, 86. In practice, the adjustment of baffles 78 and 86 is determined by test in accordance with the volume and velocity of air and amount of overspray under prevailing conditions. This adjustment is then fixed until such time as the air and overspray velocity and volume is changed under different conditions, when it may be desirable to readjust the baffles to obtain maximum removal of overspray and fumes from the air.

The invention may be modified in various respects as will occur to those skilled in the art and the exclusive use of all modifications as come within the scope of the appended claims is contemplated.

What is claimed is:

1. In a paint spray booth adapted to travel alongside a surface to be sprayed, said booth having a top, end walls, an outer side wall and an opening at its inner side spaced from and through which said surface is progressively sprayed during travel of the booth, an open-topped tank occupying the bottom of the booth, the space between said booth inner side opening and said surface providing an air inlet for said booth communicating with said tank, a wall spaced inwardly from the outer side wall of said booth forming an air outlet duct leading from said tank, a horizontally sloping apron mounted in the tank, a baffle located in the tank beneath said apron, means in the tank for flowing water therefrom over said apron to provide a curtain of water falling back into said tank, and means for drawing air into the booth through said inlet and through said water curtain in contact with said baffle to remove paint overspray and fumes from the air prior to entering said outlet duct for discharge by said last-named means from said booth.

2. In a paint spray booth adapted to travel alongside a surface to be sprayed, said booth having a top, end walls, an outer side wall and an opening at its inner side spaced from and through which said surface is progressively sprayed during travel of the booth, an open-topped tank occupying the bottom of the booth, the space between said booth inner side opening and said surface providing an air inlet for said booth communicating with said tank, a wall spaced inwardly from the outer side wall of said booth forming an air outlet duct leading from said tank, a downwardly and inwardly sloping apron mounted in the tank terminating in a downwardly curved inner marginal edge portion, a baffle located in the tank beneath said apron having a curved portion directed toward the curved portion of said apron, means in the tank for circulating water therefrom over said apron to provide a curtain of water falling back into said tank, and means for drawing air into the booth through said inlet and through said water curtain in contact with said baffle to remove paint overspray and fumes from the air prior to its entry into said outlet duct for discharge by said last-named means from the booth.

3. In a paint spray booth adapted to travel alongside a surface to be sprayed, said booth having a top, end walls, an outer side wall and an opening at its inner side spaced from and through which said surface is progressively sprayed during travel of the booth, an open-topped tank occupying the bottom of the booth, the space between said booth inner side opening and said surface providing an air inlet for said booth communicating with said tank, a wall spaced inwardly from the outer side wall of said booth forming an air outlet duct leading from said tank, a downwardly and inwardly sloping apron mounted in the tank terminating in a downwardly curved inner marginal edge portion, a baffle adjustably mounted in the tank beneath said apron having a curved portion directed toward the curved portion of said apron, a second baffle located in the tank beneath said apron outwardly of said first-named baffle, means in the tank for circulating water therefrom over said apron to provide a curtain of water falling back into said tank, and means for drawing air into the booth through said inlet and through said water curtain in contact with said baffles to remove paint overspray and fumes from the air prior to its entry into said outlet duct for discharge by said last-named means from the booth.

4. In a paint spray booth adapted to travel alongside a surface to be sprayed, said booth having a top, end walls, an outer side wall and an opening at its inner side spaced from and through which said surface is progressively sprayed during travel of the booth, a water containing open-topped tank occupying the bottom of the booth, the space between said booth inner side opening and said surface providing an air inlet for said booth communicating with said tank, a wall spaced inwardly from the outer side wall of said booth forming an air outlet duct leading from said tank, a downwardly and inwardly sloping apron mounted in the tank terminating in a downwardly curved inner marginal edge portion adjacent the inner side and below the top thereof, a laterally adjustable baffle mounted in the tank and projecting upwardly from the water level therein beneath said apron having an upper curved portion directed inwardly toward the curved portion of said apron, a pivotally mounted adjustable second baffle located in the tank beneath said apron extending above and outwardly of said first-named baffle, means in the tank for circulating water therefrom over said apron to provide a curtain of water falling back into said tank, and means for drawing air into the booth through said inlet and through said water curtain in contact with said baffles to remove paint overspray and fumes from the air prior to its entry into said outlet duct for discharge by said last-named means from the booth.

5. In a paint spray booth adapted to travel alongside a surface to be sprayed, said booth having a top, end walls, an outer side wall and an opening at its inner side spaced from and through which said surface is progressively sprayed during travel of the booth, an open-topped liquid containing tank occupying the bottom of the booth, the space between said booth inner side opening and said surface providing an air inlet for said booth communicating with said tank, a wall spaced inwardly from the outer side wall of said booth forming an air outlet duct leading from said tank, a downwardly and inwardly sloping apron mounted in the tank terminating in a downwardly curved inner marginal edge portion slightly spaced above the liquid level therein to leave a gap therebetween, a baffle mounted in the tank and projecting upwardly above the liquid level thereof beneath the apron having an upper curved portion directed inwardly toward the curved portion of said apron, means carried by said tank for circulating liquid therefrom over said apron to provide a curtain of liquid falling back into the tank across gap, and means for drawing air into the booth through said inlet and through said liquid curtain in contact with said baffle to remove paint overspray and fumes from the air prior to entering said outlet duct for discharge by said last-named means from said booth, the velocity of said air being such as to carry particles of said liquid curtain through said gap thereby setting up a liquid spray through which the air passes to further remove paint overspray and fumes therefrom.

6. In a paint spray booth adapted to travel alongside a surface to be sprayed, said booth having a top, end walls, an outer side wall and an opening at its inner side spaced from and through which said surface is progressively sprayed during travel of the booth, a water containing open-topped tank occupying the bottom of the booth, the space between said booth inner side opening and said surface providing an air inlet for said booth communicating with said tank, a wall spaced inwardly from the outer side wall of said booth forming an air outlet duct leading from said tank, a horizontally disposed downwardly and inwardly sloping apron mounted in the tank terminating in a downwardly curved inner marginal edge portion spaced above the water level therein, a baffle in the tank projecting above the water level therein beneath said apron and outwardly spaced from the curved marginal edge portion thereof, means carried by the tank including a pipe having apertures therein opening onto the outer edge portion of said apron for circulating water from the tank thereover to provide a curtain of water falling back into the tank, and means for drawing air into the booth through said inlet and through said water curtain in contact with said baffle to remove paint overspray and fumes from the air prior to its entry into said outlet duct for discharge by said last-named means from the booth.

7. In a self-propelled paint spray booth adapted to travel alongside a surface to be sprayed and having a base portion extending outwardly beyond the ends thereof, said booth being otherwise closed but having an opening at its inner side spaced from and through which said surface is progressively sprayed during travel of the booth, a water containing open-topped tank occupying the bottom of the booth and having an end portion thereof extending into one end of said base portion of the booth, the space between said booth inner side opening and said surface providing an air inlet for said booth communicating with said tank, spaced walls at the outer side of the booth forming an air outlet duct leading from said tank, power means for driving the booth mounted in the other end of said booth base portion, a horizontally disposed inwardly sloping apron mounted in the tank having a downwardly curved inner marginal edge portion spaced above the water level therein, a pipe supported in the tank coextensive with the outer side of said apron formed with apertures opening thereon, a pump carried by the tank in the said end portion thereof extended into the said end of said booth base portion and submerged below the water level therein, said pump being connected with said pipe for flowing water from the tank through said apertures over said apron to provide a curtain of water falling back into the tank, and means for drawing air into the booth through said inlet and through said water curtain to remove paint overspray and fumes from the air prior to entering said outlet duct for discharge by said last-named means from said booth.

8. The substance of claim 7 wherein said apertures in said pipe are provided with adjustable closures for controlling the flow of water therethrough and over said apron.

9. In a self-propelled paint spray booth adapted to travel alongside a surface to be sprayed, said booth being otherwise closed but having an opening at its inner side spaced from and through which said surface is progressively sprayed during travel of the booth, a water containing open-topped tank occupying the bottom of the booth, the space between said booth inner side opening and said surface providing an air inlet for said booth communicating with said tank, spaced walls at the outer side of the booth forming an air outlet duct leading from said tank, a horizontally disposed inwardly sloping apron wholly mounted within the tank adjacent said air outlet duct having a downwardly curved inner marginal edge portion spaced above the water level therein, a baffle mounted in the tank and extending upwardly from the water level therein beneath the apron having a curved upper portion directed toward the curved inner portion of said apron, a pivotally mounted adjustable baffle in said air outlet duct, means in the tank for flowing water therefrom over said apron to provide a water curtain falling back into the tank, and means for drawing air into the booth through said inlet and through said water curtain in contact with said baffles to remove paint overspray and fumes from the air prior to discharge by said last-named means from said booth through said outlet duct.

10. In a paint spray booth adapted to travel alongside a surface to be sprayed, said booth having a top, end walls, an outer side wall and an opening at its inner side spaced from and through which said surface is progressively sprayed during travel of the booth, a water containing open-topped tank occupying the bottom of the booth, the space between said booth inner side opening and said surface providing an air inlet for said booth communicating with said tank, a wall spaced inwardly from the outer side wall of said booth forming an air outlet duct leading from said tank, supporting brackets fixed in the tank, a horizontally disposed downwardly and inwardly sloping apron terminating in a downwardly curved inner edge portion, means for removably mounting said apron in the tank comprising spaced supporting plates having their upper portions secured to said apron and their lower portions tied together by pipes extending longitudinally of the tank and supported on said brackets, an adjustable baffle pivotally carried by said supporting plates beneath said apron, means carried in the tank for circulating water therefrom over said apron to provide a curtain of water falling back into the tank, and means for drawing air into the booth through said inlet and through said water curtain in contact with said pivoted adjustable baffle to remove paint overspray from the air prior to its discharge by said last-named means from the booth through said outlet duct.

References Cited in the file of this patent

UNITED STATES PATENTS

| | | |
|---|---|---|
| 2,081,742 | Glaze | May 25, 1937 |
| 2,086,514 | Saunders et al. | July 6, 1937 |
| 2,132,826 | Ludwig | Oct. 11, 1938 |
| 2,137,862 | Steins | Nov. 22, 1938 |
| 2,180,586 | Gustafsson | Nov. 21, 1939 |
| 2,266,335 | Roche et al. | Dec. 14, 1941 |
| 2,337,983 | Fisher | Dec. 28, 1943 |
| 2,425,940 | Iverson | Aug. 19, 1947 |
| 2,527,139 | Loney | Oct. 24, 1950 |